(12) United States Patent
Kantamneni et al.

(10) Patent No.: US 11,063,833 B2
(45) Date of Patent: Jul. 13, 2021

(54) DEPENDENCY TRACKING USING APPLICATION LAYER AND NETWORK LAYER INFORMATION

(71) Applicant: Capital One Services, LLC, McLean, VA (US)

(72) Inventors: Manideep Kantamneni, Henrico, VA (US); Brandon Clodius, Richmond, VA (US); Venkat Yashwanth Gunapati, Ashburn, VA (US); Naveen Bansal, Glen Allen, VA (US); Tariq Bhatti, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 57 days.

(21) Appl. No.: 16/578,873

(22) Filed: Sep. 23, 2019

(65) Prior Publication Data

US 2021/0092022 A1   Mar. 25, 2021

(51) Int. Cl.
*G06F 15/173* (2006.01)
*H04L 12/24* (2006.01)
*H04L 12/26* (2006.01)

(52) U.S. Cl.
CPC .......... *H04L 41/12* (2013.01); *H04L 41/0226* (2013.01); *H04L 41/22* (2013.01); *H04L 43/045* (2013.01)

(58) Field of Classification Search
None
See application file for complete search history.

(56) References Cited

U.S. PATENT DOCUMENTS

| | | | |
|---|---|---|---|
| 9,819,729 B2 | 11/2017 | Moon et al. | |
| 2004/0199548 A1* | 10/2004 | Miller | G06F 16/273 |
| 2009/0287744 A1* | 11/2009 | Bernardini | G06F 11/3495 |
| 2012/0005158 A1* | 1/2012 | Bhatt | G06F 16/2358 |
| | | | 707/609 |
| 2012/0317088 A1* | 12/2012 | Pantel | G06F 16/972 |
| | | | 707/706 |
| 2016/0292166 A1* | 10/2016 | Russell | G06F 16/248 |
| 2017/0180403 A1* | 6/2017 | Mehta | H04L 63/1416 |
| 2018/0034685 A1* | 2/2018 | Naous | H04L 41/22 |

(Continued)

*Primary Examiner* — Phuoc H Nguyen
(74) *Attorney, Agent, or Firm* — Sterne, Kessler, Goldstein & Fox P.L.L.C.

(57) ABSTRACT

Disclosed herein are systems, products, and/or methods for determining a dependency between a task and a hardware component executing the task. The method may include: accessing an execution log storing information related to a plurality of tasks, each task of the plurality of tasks being executed by a respective computing device of a plurality of computing devices distributed across a network architecture; identifying a task of the plurality of tasks to obtain application layer information of the identified task; determining which respective computing device executed the identified task to obtain network layer information of the respective computing device; generating a dependency map illustrating a relationship between the identified task and the respective computing device that executed the identified task, the relationship including the application layer information and the network layer information; and displaying, using an interactive graphical user interface (GUI) on a user device, the dependency map.

17 Claims, 6 Drawing Sheets

(56) References Cited

U.S. PATENT DOCUMENTS

2018/0124182 A1    5/2018   Orman
2018/0287907 A1   10/2018   Kulshreshtha et al.
2019/0173736 A1    6/2019   Ponnuswamy et al.
2019/0182101 A1    6/2019   Kulshreshtha et al.

* cited by examiner

DEPENDENCY TRACKING USING APPLICATION LAYER AND NETWORK LAYER INFORMATION

FIELD

This disclosure is generally directed to dependency tracking using application layer and network layer information.

BACKGROUND

Graph models may use graph structures for semantic queries with nodes, edges, and properties to represent and store data. The graph models represent data items as a collection of nodes and edges, with the edges representing the relationships between respective nodes. Thus, as the relationships may be visually displayed, graph models may be useful in illustrating heavily inter-connected data. While the graph models may lay out the dependencies between nodes of data, these dependencies generally lack substantial details about the nodes, such as application layer information and network layer information. For example, in cloud computing services, computing system resources may be called upon as needed to execute any number of tasks, such that a task may be executed by a different computing system resource each time its executed. As a result, it is challenging to link information related to the task (e.g., application layer information) with information related to the computing resource that executed the task (e.g., network layer information).

BRIEF DESCRIPTION OF THE FIGURES

The accompanying drawings are incorporated herein and form a part of the specification.

Reference numerals refer to corresponding parts throughout the several views of the drawings. Additionally and generally, the left-most digit(s) of a reference number identifies the drawing in which the reference number first appears.

DETAILED DESCRIPTION

This disclosure is generally directed to dependency tracking using application layer and network layer information. Using this dependency information, a user may readily identify any errors due to a task failure or hardware failure that affects the performance of an application, rather than parsing through each task and/or hardware element to identify a source of the problem. As a result, the user may dispatch any remedies to resolve the errors in a more efficient and expedited manner.

In some embodiments, the term "computing resource" as discussed throughout the detailed description may generally represent any hardware and/or software systems, applications, and/or components. In some embodiments, the "computing resource" may vary based on the context in which it is discussed throughout. For example, a "computing resource" may represent a virtual machine, a server device, and/or the like. In a further example, a "computing resource" may represent a set of physical processors of a server device, total RAM of a server device, or the like. In some embodiments, the scope and definition of the term "computing resource" may vary depending on context, thus the term "cloud computing resource identifier" as discussed throughout the detailed description may generally represent any identifier that may be assigned to hardware and/or software systems, applications, and/or components to identify these systems, applications, and/or components. For example, a "cloud computing resource identifier" may include a cloud VM identifier that identifies a virtual machine executing on a server device.

Figure 1:
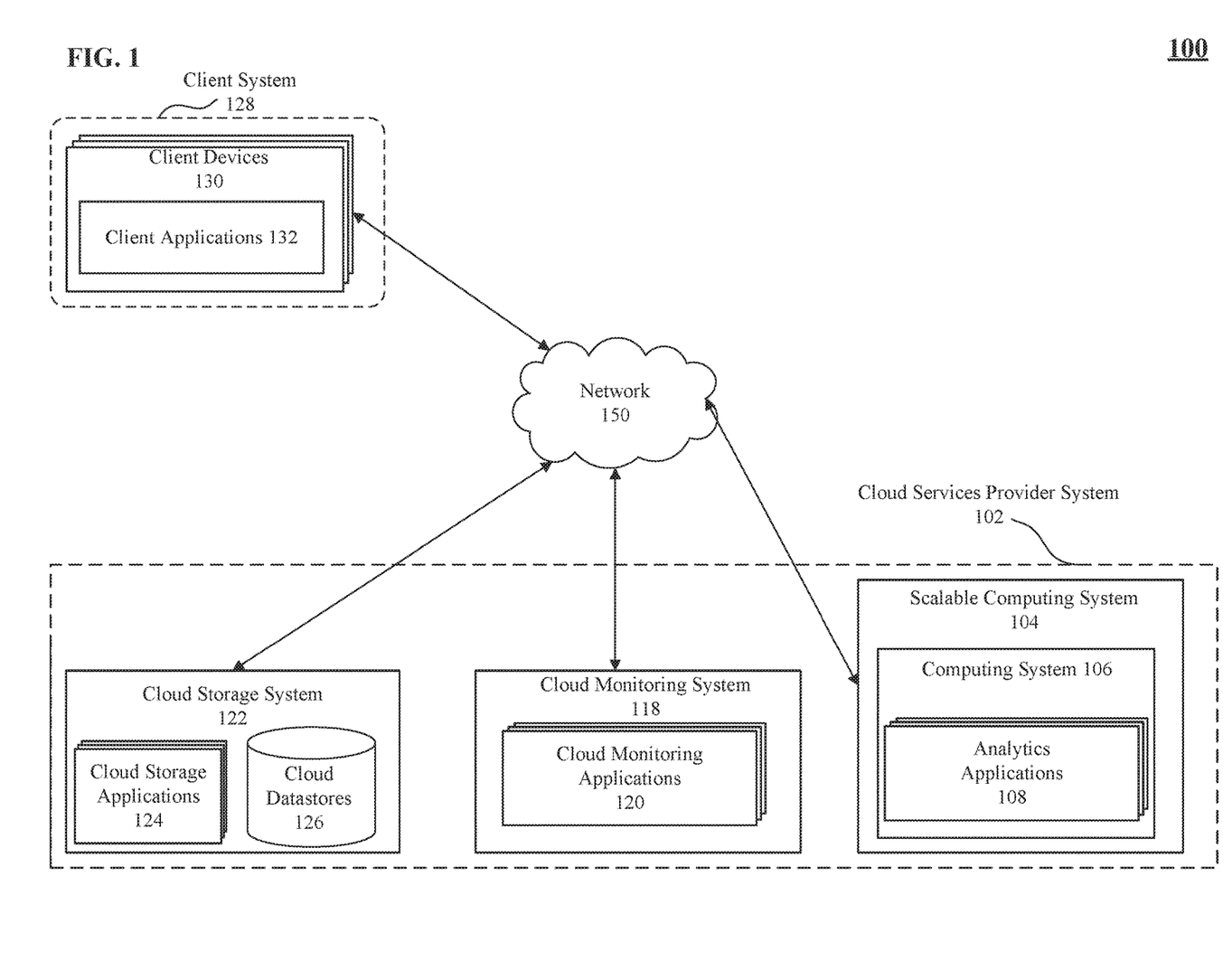
FIG. 1 illustrates a system for dependency tracking using application layer and network layer information, according to an example embodiment.

FIG. 1 illustrates a resource monitoring system 100 for monitoring clusters in a cluster computing system according to an example embodiment.

In some embodiments, the resource monitoring system 100 may include a cloud services provider system 102 and a client system 128. The cloud services provider system 102 may further include a scalable computing system 104, a cloud monitoring system 118, and a cloud storage system 122. All of these systems may be operatively and/or communicatively coupled via a network 150.

In some embodiments, the client system 128 may be representative of computing systems utilizing services provided by the cloud services provider system 102. In some embodiments, the client system 128 may include, without limitation, one or more client devices 130 that may be used by one or more users utilizing the services of the cloud services provider system 102. For example, one or more users may request execution of one or more client applications 132 configured to communicate with the scalable computing system 104 via the network 150. In some embodiments, the one or more client applications 132 may be further configured to receive notifications from the scalable computing system 104 via the network 150.

The network 150 may be representative of one or more computer and/or telecommunications networks that may enable coupled and/or interconnected systems and/or devices to communicate information between and among each other. In various embodiments, the network 150 may include, without limitation, intranet, extranet, Internet, and/or any other local, regional, global telecommunications network. In various embodiments, the network 150 may include various wireless network devices configured to encode and/or decode information and receive and/or transmit the encoded information as radio signals in frequencies consistent with the one or more wireless communications standards (e.g., Wireless IEEE 802.11, WiMAX® IEEE 802.16, Global Systems for Mobile Communications (GSM), Enhanced Data Rates for GSM Evolution (EDGE), 3G, 4G, Long Term Evolution (LTE®), 5G, Bluetooth standards, Near Field Communications (NFC) standards, etc.). Additionally, or alternatively, the network 150 may also include various wired network devices configured to receive and/or transmit the encoded information as electrical and/or optical signals consistent with one or more wired and/or optical network standards (e.g., Ethernet, Fibre Channel, etc.).

In some embodiments, the cloud services provider system 102 may be representative of a system arranged to provide cloud computing services such as, for example, Infrastructure as a Service (IaaS), Platform as a Service (PaaS), Desktop as a Service (DaaS), Software as a Service (SaaS), Storage as a Service (StaaS), Function as a Service (FaaS), Database as a Service (DBaaS), or the like. Additionally, the cloud services provider system 102 may also provide application developers utilizing the client system 128 with tools for accelerated development, deployment, orchestration, and management of their application. For example, the cloud services provider system 102 may be representative of various data centers of cloud computing services providers (e.g., Microsoft® Azure®, Amazon® Web Services® (AWS®), Google® Compute Engine™, Alibaba® AliCloud®, Digital Ocean®, Vultr®, Linode®, etc.), each implementing a variety of protocols (e.g., Hyper Text Transfer Protocol (HTTP), HTTP Secure (HTTPS), etc.), standard formats (e.g., Representational State Transfer (REST), JavaScript Object Notation (JSON), Extensible markup Language (XML), Remote Procedure Call (RPC), etc.), and/or APIs (e.g., Microsoft® Services Management APIs, Amazon® Elastic Compute Cloud® (EC2®) APIs, Google® Cloud Platform (Anthos®) APIs, etc.). Additionally or alternatively, in some embodiments, cloud services provider system 102 may be representative of data centers internal or external to a client system's 128 organization configured to provide cloud computing services.

In some embodiments, one or more systems within the cloud services provider system 102 may be geographically separated (e.g., separate physical locations, etc.) and virtually separated (e.g., separate network domains, etc.). In some embodiments, one or more systems within the cloud services provider system 102 may be substantially geographically co-located (e.g., in substantially the same physical location, etc.) and virtually connected (e.g., in the same network domain, etc.). Alternatively, in some embodiments, one or more systems within the cloud services provider system 102 may be geographically separated yet virtually connected or substantially geographically co-located yet virtually separated.

In some embodiments, the cloud services provider system 102 may include a scalable computing system 104. The scalable computing system 104 may be arranged to provide underlying hardware and/or software infrastructure for one or more applications 108. The underlying hardware and/or infrastructure may typically include server devices, storage devices, networking devices, and virtualization services. For example, the scalable computing system 104 may be arranged to include a plurality of server devices, where each server device may be configured to execute at least one virtual machine. The scalable computing system 104 may be arranged to provision the at least one virtual machine to the plurality of server devices based at least on requests from the cloud services provider system 102 and/or client system 128. Each provisioned virtual machine may be further configured to include specialized applications, libraries, data, and/or configurations.

In some embodiments, the scalable computing system 104 may further include a computing system 106 configured to execute a plurality of applications 108. In some embodiments, the computing system 106 may be arranged to execute the plurality of applications 108 on the underlying hardware and/or software infrastructure of the scalable computing system 104. In some embodiments, the plurality of applications 108 may be configured with a distributed framework (e.g., Apache® Hadoop®, Apache® Spark®, etc.) to provide one or more micro-services.

In some embodiments, the cloud monitoring system 118 may be configured to notify a user of the client system 128, an application associated with the user of the client system 128, and/or a system within the cloud services provider system 102 regarding one or more monitored conditions that have occurred within the cloud services provider system 102 and/or the client system 128. This in turn, would allow, for example, an administrator of the cloud services provider system 102 and/or the client system 128 receiving such notifications to take additional actions or perform additional operations based on the occurrence of the one or more monitored conditions. In some embodiments, the cloud monitoring system 118 may include, without limitation, one or more cloud monitoring applications 120.

In some embodiments, the cloud storage system 122 may be configured to transmit, receive, and/or store information associated with the cloud services provider system 102 and client system 128 as data containers in a tiered file system and/or as objects in an object storage. In an embodiment, the cloud storage system 122 may include, without limitation, one or more cloud storage applications 124 and one or more distributed cloud datastores 126. In some embodiments, the one or more cloud storage applications 124 may be configured to store metrics, logs, and/or events received from the one or more systems and applications within the cloud services provider system 102 and/or from the client system 128.

In some embodiments, the one or more cloud storage applications 124 may be configured to store data (e.g., machine learning training data for machine learning algorithms, scientific data for scientific simulations, financial data for financial analysis, configuration data for configuring applications, etc.) associated with a user of the client system 128 or an application of client system 128 in one or more distributed cloud datastores 126. In some embodiments, to facilitate the storage and retrieval of data, the one or more cloud storage applications 124 may be configured to receive cloud storage requests to store data within the one or more cloud data stores 126. In some embodiments, to facilitate the retrieval of data, the one or more cloud storage applications 124 may be configured to receive cloud retrieval requests from systems and/or applications to retrieve data stored within the one or more cloud data stores 126. In response to the cloud retrieval requests, the one or more cloud storage applications 124 may be further configured to transmit cloud retrieval responses with the requested data to the systems and/or applications based on the received cloud retrieval requests.

In some embodiments, the cloud monitoring applications 120 may be configured to request, receive, and/or store metrics, logs, and/or events generated by the hardware and/or software of the cloud services provider system 102 and/or the client system 128. For example, the cloud monitoring applications 120 may access an execution log storing information related to a plurality of tasks of the applications 108, the cloud storage applications 124, and/or the client applications 132. For example, the information stored in the execution log may include a respective name of each of the applications, relationship information between tasks and associated sub-tasks executed to support the respective applications, information related to the processing of the tasks and associated sub-tasks (e.g., a start time and end time of the tasks and associated sub-tasks and/or an amount of processing resources for executing the tasks and associated sub-tasks), an amount of data processed by the tasks and associated sub-tasks, a type of the tasks and associated sub-tasks, an action type of the tasks and associated sub-tasks, a network address of a respective device of the tasks and associated sub-tasks, or the like. It should be understood by those of ordinary skill in the arts that these are merely examples of the information stored in the execution logs, and that additional (or less) information may be stored in the execution logs.

In some embodiments, each task of the plurality of tasks may be executed by a respective computing device of a plurality of computing devices distributed across a network architecture, as discussed herein. The plurality of tasks may be related to applications on the analytics applications 108, cloud storage applications, 124, and/or client applications 132. For example, the plurality of tasks may be an upstream lineage indicating a list of services which calls and/or consumes, for example, an application-programming interface (API) or a grouping of physical or logical components that directly support the API. Alternatively, the plurality of tasks may be a downstream lineage indicating a list of services which is being called from the API or grouping of physical or logical components that directly support the API. In some embodiments, the API may be, for example, a Representational State Transfer (REST) API, a Simple Object Access Protocol (SOAP), or the like.

In some embodiments, the cloud monitoring applications 120 may be configured to identify a task of the plurality of tasks to obtain application layer information of the identified task. For example, the application layer information may include, but is not limited to, a time stamp, a start time, an end time, a response time, a request time, a service or operation, and/or a message identification (ID). It should be understood by those of ordinary skill in the arts that these are merely examples of application layer information and that other types of application layer information are further contemplated in accordance with aspects of the present disclosure. In some embodiments, the cloud monitoring applications 120 may be further configured to identify one or more sub-tasks associated with the plurality of tasks. For example, the one or more sub-tasks (i.e., secondary tasks) may be a task that supports or is related to the associated task. The secondary sub-tasks may likewise be associated with one or more tertiary tasks, and so on and so forth. In this way, the cloud monitoring applications 120 may identify each task that is executed by a given application.

In some embodiments, the cloud monitoring applications 120 may be further configured to determine which respective computing device executed the identified task or sub-task(s) to obtain network layer information of the respective computing device. For example, the cloud monitoring applications 120 may determine which respective computing device executed the identified task or sub-task(s) based on a network address, such as a gateway address, of the respective computing device. For example, the cloud monitoring applications 120 may use a lookup table to identify which computing device executed the task based on the gateway address. The network layer information may include, but is not limited to, memory usage of the respective computing device, processor usage of the respective computing device, a number of tasks executed by the respective computing device, information about traffic going to and from network interfaces of the computing device, or the like. It should be understood by those of ordinary skill in the arts that these are merely examples of network layer information and that other types of network layer information are further contemplated in accordance with aspects of the present disclosure.

In some embodiments, the cloud monitoring applications 120 may be further configured to generate a dependency map illustrating a relationship between the identified task and the respective computing device that executed the identified task. For example, the cloud monitoring applications 120 may combine the application layer information obtained from the execution log and the network layer information obtained based on the identified computing device that executed the task. Additionally, the dependency map generated by the cloud monitoring applications 120 may also include a relationship between the task and associated sub-task(s). That is, as the execution log includes relationship information between the tasks and its associated sub-tasks, the dependency map may include such relationship information. Furthermore, the cloud monitoring applications 120 may include the network layer information for each of the associated sub-task(s) and the respective computing device(s). That is, the cloud monitoring applications 120 may generate a dependency map illustrating a relationship between a task and its related sub-tasks. For example, the dependency map may illustrate a relationship between a first system that executed a task and its associated network resources (i.e., the application layer information and the network layer information of the task) and a second system that executed a sub-task associated with the task (i.e., the application layer information and the network layer information of the sub-task). In this way, a user may monitor which tasks are calling on each other and which computing devices in the network architecture are calling on each other. In some embodiments, the cloud monitoring applications 120 may be further configured to display, using an interactive graphical user interface (GUI) on a user device, the dependency map. For example, the dependency map may be displayed on one of the client devices 130. An example dependency map is further discussed below with respect to FIG. 4.

In some embodiments, the cloud monitoring applications 120 may be further configured to monitor state information of the relationship between the identified task and the computing device that executed the identified task. The state information may include, but is not limited to, a health, a success rate, a failure rate, etc. of the task, as well as an amount of resources consumed by the computing device executing the given task. In this way, the cloud monitoring applications 120 may monitor whether the task and/or the respective computing device has incurred an error. For example, the error may be related to the execution of the task itself or it may be related to the flow traffic along the network. In some embodiments, the cloud monitoring applications 120 may be configured to update the state information on a periodic basis, e.g., daily, weekly, monthly, etc. Using this information, the cloud monitoring applications 120 may be further configured to display, on the dependency map, a task error based on the state information. In some embodiments, the cloud monitoring applications 120 may be further configured to indicate any sub-tasks affected by the task error.

Figure 2:
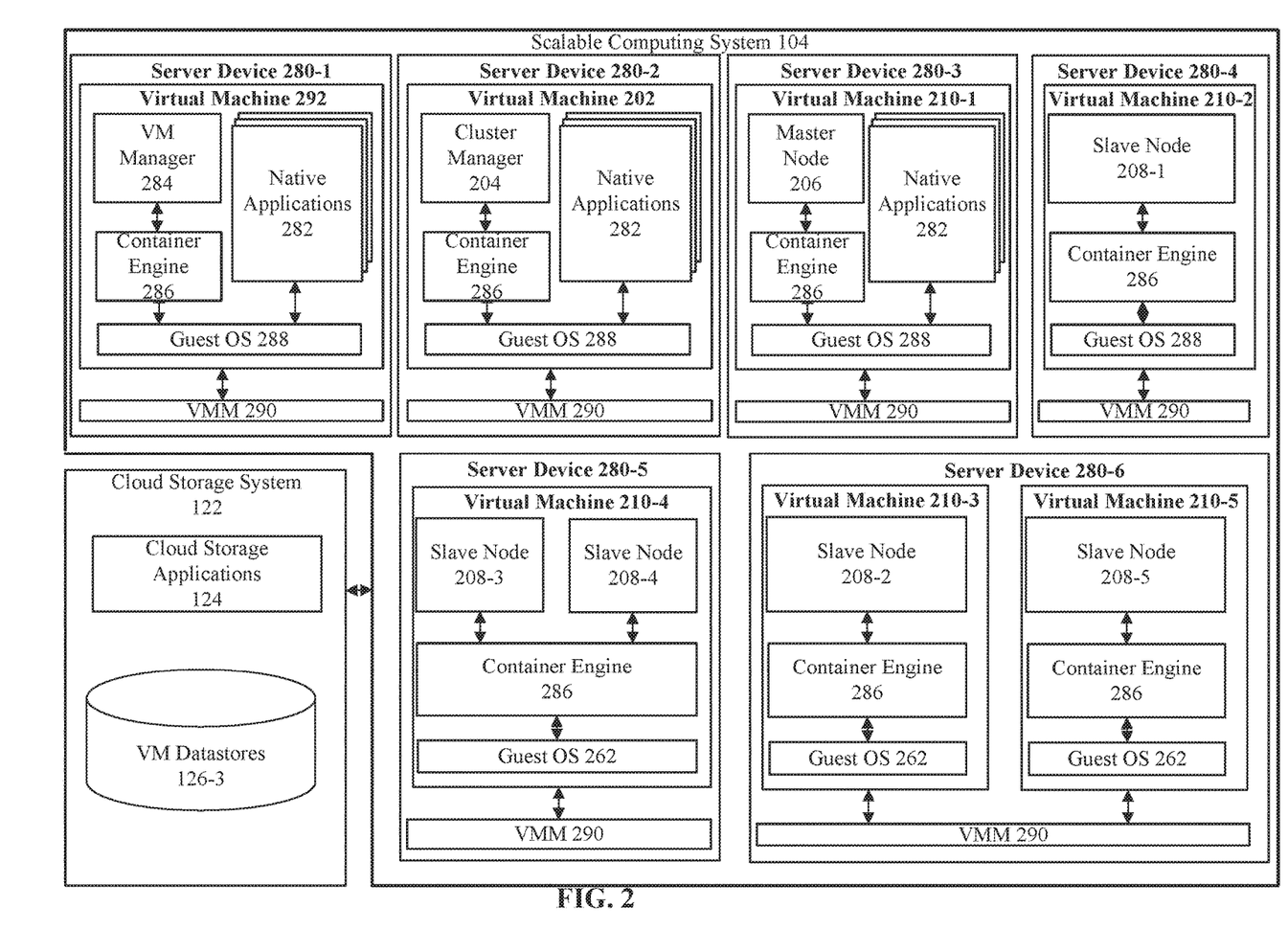
FIG. 2 illustrates server devices of a scalable computing system configured to host one or more virtual machines, according to an example embodiment.

FIG. 2 illustrates server devices 280 of the scalable computing system 104 configured to host one or more virtual machines 292, 202, and 210 according to an example embodiment. In some embodiments, to provide virtual machines 292, 202, and 210 with physical hardware for execution of their applications, the scalable computing system 104 may include, without limitation, one or more server devices 280. In some embodiments, each of the server devices 280 of the scalable computing system 104 may also vary based on their available computing resources (e.g., number of physical processors, amount of RAM, maximum amount of storage, maximum amount of network bandwidth, etc.). For example, one or more server devices 280 may be configured for specific hardware optimizations (e.g., optimized for general purpose computing, optimized for accelerated computing, optimized for memory intensive computing, etc.) and may vary by number of physical processors (e.g., 1, 2, 4, 6, 8, 16, 24, 32, 64, 128, etc.), overall processing bandwidth of one or more processors (e.g., cumulative cycles per second, floating-point operations per second (FLOPS), etc.), the amount of installed RAM (e.g., 16 GB, 32 GB, 64 GB, 128 GB, etc.), vary by the maximum network bandwidth available (e.g., 1, Gbps, 10 Gbps, etc.), the amount of storage installed (6 TB, 12 TB, etc.), the maximum storage bandwidth available (e.g., 3,500 Mbps, 7,000 Mbps, 14,000 Mbps, etc.), and/or the like.

In some embodiments, the server devices 280 may be geographically separated (e.g., separate physical locations, etc.) and virtually separated (e.g., separate network domains, etc.). In other embodiments, the server devices 280 may be substantially geographically co-located (e.g., in substantially the same physical location, etc.) and virtually connected (e.g., in the same network domain, etc.). Alternatively, in some embodiments, the server devices 280 may be geographically separated yet virtually connected or substantially geographically co-located yet virtually separated. For example, the server device 280-1 may be physically located in one geographic region separate from the server device 280-2, 280-3, 280-4, 280-5, and 280-6, yet virtually connected. In some embodiments, the availability of server devices 280 and their associated computing resources may vary based on the geographic region. For example, availability of server devices 280 configured to handle memory-intensive computing with 64 physical processors and 128 GB of RAM may be limited in Northern Virginia as compared to Northern California. Other performance measures, including latency and cost, may also be considered.

In some embodiments, each of the server devices 280 of the scalable computing system 104 may be configured to include, without limitation, a hypervisor or virtual machine monitor (VMM) (e.g., VMM 290 of server device 280-1). In some embodiments, the VMMs 290 may be configured to execute directly on the server devices (e.g., server devices 280) and manage the concurrent execution of one or more virtual machines 292, 202, and 210 (e.g., virtual machine 210-3 virtual 210-5 of server device 280-6). For example, VMM 290 of server device 280-1 may be representative of a native or bare-metal hypervisor (e.g., VMware® ESXi™ hypervisor, Microsoft® Hyper-V® hypervisor, KVM hypervisor, Proxmox™ VE hypervisor, Citrix® XenServer® Xen™ hypervisor, etc.) configured to execute and/or manage one or more instances of virtual machines 292, 202, and/or 210, for example. Additionally, or alternatively, hosted VMMs may be run on a native host operating system. With sufficient hardware virtualization support (e.g., AMD® AMD-V, AMD-Vi, AMD-RVI; Intel® VT-x, VT-i, VT-d; ARM® Virtualization Extensions, System Memory Management Unit (SMMU), TrustZone®; Samsung® Exynos® SysMMU; Sun® Input-Output Memory Management Unit (IOMMU); other IOMMU, SMMU, or equivalent virtualization-extensions architecture, etc.) underlying the host operating system, hosted VMMs may run one or more virtual machines 292, 202, and/or 210 with native or near-native performance. Examples of hosted VMMs include VMware® Server, Oracle® VirtualBox®, Oracle® Virtual Iron™, BSD® Hypervisor (Bhyve™), QEMU™, etc.

In some embodiments, the one or more virtual machines 292, 202, and 210 may include, without limitation, a guest operating system (OS) 288 (e.g., Microsoft® Windows® Server, Canonical® Ubuntu® Server, Debian® Linux®, CentOS® Linux®, IBM® Red Hat® Linux®, CoreOS® Container Linux®, Intel® Clear Linux®, Microsoft® Azure® Sphere®, etc.). In some embodiments, each guest OS may be configured to execute one or more native applications 282 and one or more container engines 286 (e.g., Docker® Engine, rkt, LXC™ (including Anbox™), Oracle® Solaris® Zones, FreeBSD® Jails, Linux® cgroups, IBM® AIX® Workload Partitions, Virtuozzo® OpenVZ®, etc.). Containers may refer generically to any software-level or OS-level virtualization or paravirtualization, in some embodiments. In some embodiments, the native applications 282 may be configured to assist in the execution of the master nodes and/or slave nodes in container engines 286 of the one or more guest OS 288. In some embodiments, master and/or slave nodes may form a part of a distributed software and/or storage framework, such as Apache® Hadoop®, Amazon® Elastic MapReduce, or similar software ecosystems that may be based at least in part on a MapReduce programming model, and that may be hosted in at least one virtual machine, such as virtual machines 210-1 through 210-5, for example. In some embodiments, the native applications 282 may also share a common execution environment with a container engine in a guest OS 288.

In some embodiments, each of the one or more container engines 286 may be configured to host and manage the execution of one or more container applications such as, the cluster manager 204, one or more master nodes (e.g., master node 206 hosted of virtual machine 210-1), and/or one or more slave nodes (e.g., slave nodes 208-3 and 208-4 of virtual machine 210-4). It is to be appreciated that in some implementations, the one or more master nodes and slave nodes may be executed by the container engine 286 in one or more container instances, where each container instance (not shown) may execute the master nodes and/or slave nodes in its own isolated runtime environment. Thus, each container instance may include, without limitation, a container operating system (OS), one or more container applications associated with the master nodes and/or slave nodes, and associated container components (e.g., executable binaries, support libraries, etc.) to support the execution of the master nodes and slave nodes.

In some embodiments, and to assist in the management of one or more virtual machines 210 executing on one or more server devices 280 (e.g., server devices 280-3, 280-4, 280-5, 280-6, etc.), the server device 280-1 may include virtual machine 292 and may be managed by the cloud computing services provider of the cloud services provider system 102. In some embodiments, the virtual machine 292 may include a virtual machine (VM) manager 284 configured to provision virtual machines based on one or more virtual machine (VM) provisioning requests received from one or more systems and/or applications (e.g., client manager 204, serverless manager 232, etc.). In some embodiments, a VM provisioning request may include one or more VM provisioning parameters. The one or more VM provisioning parameters may include, without limitation, a number of virtual machines to provision and the VM configuration parameters for each virtual machine.

In some embodiments, and in response to the VM provisioning request, the VM manager 284 may be configured to identify one or more server devices 280 with available computing resources that can match or otherwise satisfy the VM provisioning request. After identifying one or more available server devices 280, the VM manager 284 may be further configured to provision one or more virtual machines 280 having the VM configuration parameters specified in the VM provision request to the available one or more available server devices 280. Each of the provisioned virtual machines 280 may be identified by a cloud VM identifier, which may be a unique alpha numeric identifier among all other cloud VM identifiers and may be assigned by the cloud computing services provider of cloud services provider system 102.

For example, and to provision the one or more virtual machines 280, the VM manager 284 may identify and/or configure one or more VM images stored in the VM datastores 126-3 with the specified VM configuration parameters. Continuing with the example, the VM manager 284 may further transmit or cause the transmission of the identified and/or configured one or more VM images to VMMs 290 of the identified one or more server devices 280 with available computing resources. It is to be appreciated that each of the identified and/or configured VM images may be appropriately matched with the computing resources available of the identified one or more server devices 280. Continuing with the example, the VM manager 284 may then configure and/or request the execution of the VM images on the identified one or more server devices 280 by the respective VMMs 290s.

In some embodiments, the VM manager 284 may be further configured to transmit a VM provisioning response to each of the systems and/or applications that transmitted a VM provisioning request. The VM provisioning response may include, without limitation, one or more cloud VM identifiers assigned to each provisioned virtual machine. In some embodiments, the VM manager 284 may also be configured to receive VM termination requests from the one or more systems and/or applications, which may include the one or more cloud VM identifiers. Thus, the cloud VM identifiers may be used by the systems and/or applications to terminate a previously provisioned virtual machine so as to free up any computing resources (e.g., physical processors, RAM, of the server devices) used by the identified virtual machines to be terminated. In some embodiments, the VM manager 284 may include a combination of hardware (e.g., physical processors, memory, application specific integrated circuit (ASIC), field programmable gate array (FPGA)) and/or executable software (e.g., executable code, interpreted code, managed code, library code, etc.).

Examples of VM manager 284 may include Apache® CloudStack®, IBM® Red Hat® Virtual Machine Manager (virt-manager)™, IBM® Red Hat® Libvirt™, Kimchi Project™ Kimchi, TotalCloud®, Citrix® GoTo Cloud Services®, etc. Additionally or alternatively, software for orchestration of containers or virtual machines may fulfill the role of VM manager 284. Further examples of VM manager 284 in an orchestration role may include Spotinst™ Elastigroup™, Google® Kubernetes®, Google® Ganeti®, IBM® Red Hat® oVirt®, Proxmox™ Virtual Environment (VE), OpenQRM™, Microsoft® System Center Virtual Machine Manager (SCVMM), IBM® Red Hat® OpenShift®, Amazon® Elastic Container Service (ECS), etc.

Figure 3:
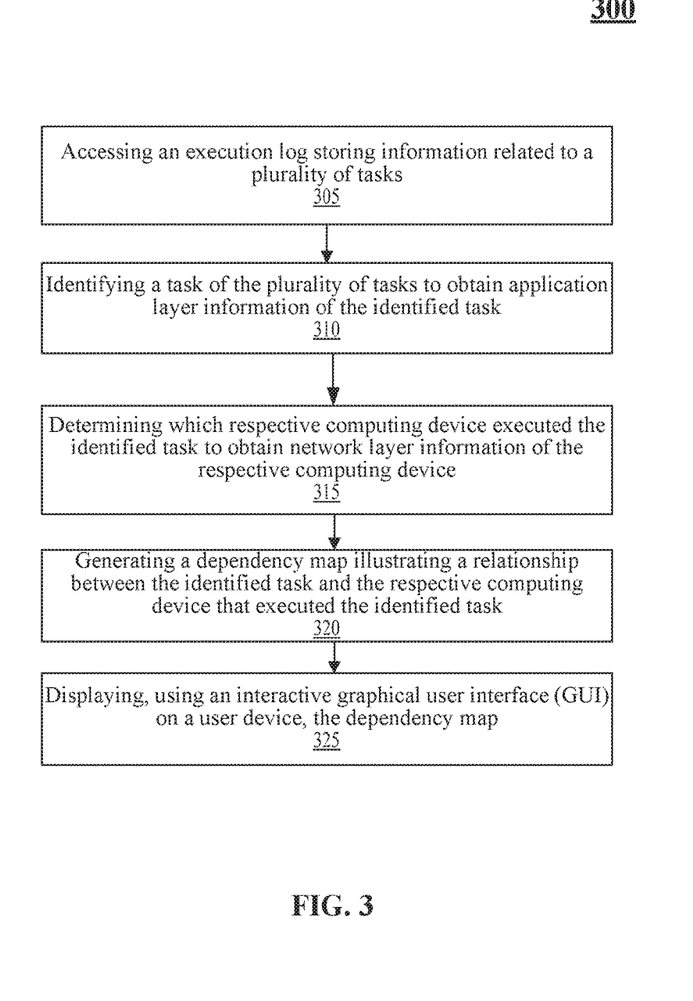
FIG. 3 illustrates a logic flow for determining a dependency between a task and a hardware component executing the task, according to an example embodiment.

FIG. 3 illustrates a logic flow for determining a dependency between a task and a hardware component executing the task according to an example embodiment. For example, in 305, the cloud monitoring applications 120 may access an execution log storing information related to a plurality of tasks. For example, the information stored in the execution log may include information related to one or more applications executed by the cloud services provider system 102 and/or client system 128, such as a respective name of each task and associated sub-task executed to support the respective applications, relationship information between the tasks and associated sub-tasks, information related to the processing of the tasks and associated sub-tasks (e.g., a start time and end time of the tasks and associated sub-tasks and/or an amount of processing resources for executing the tasks and associated sub-tasks), an amount of data processed by the tasks and associated sub-tasks, a type of the tasks and associated sub-tasks, an action type of the tasks and associated sub-tasks, a network address of a respective device of the tasks and associated sub-tasks, or the like. In some embodiments, each task of the plurality of tasks may be executed by a respective computing device of a plurality of computing devices distributed across a network architecture. As such, in 310, the cloud monitoring applications 120 may identify a task of the plurality of tasks to obtain application layer information of the identified task, e.g., the information stored in the execution log. By accessing the execution log(s) and identifying a task, the cloud monitoring applications 120 may then determine which computing device executed a given task.

For example, after obtaining the application layer information, including a gateway address of the identified task, in 315, the cloud monitoring applications 120 may also determine which respective computing device executed the identified task to obtain network layer information of the respective computing device. In some embodiments, the cloud monitoring applications 120 may use a lookup table to identify which computing device executed the task based on the gateway address. In this way, the cloud monitoring applications 120 may identify which computing device executed a given task, which may change for each instance the given task is executed.

In 320, the cloud monitoring applications 120 may also generate a dependency map illustrating a relationship between the identified task and the respective computing device that executed the identified task. For example, the cloud monitoring applications 120 may combine the application layer information and the network layer information to generate the relationship information. In further embodiments, the dependency map may also include a relationship between a task and its associated sub-tasks. To achieve this, the cloud monitoring applications 120 may determine which tasks and sub-tasks are associated with one another based on the information stored in the execution log. Using this dependency information, a user may readily identify any errors due to a task failure or hardware failure that affects the performance of an application, rather than parsing through each task and/or hardware element to identify a source of the problem. As a result, the user may dispatch any remedies to resolve the errors in a more efficient and expedited manner.

In 325, a user device, e.g., client device 130, may be used to display the dependency map on an interactive graphical user interface (GUI).

Figure 4:
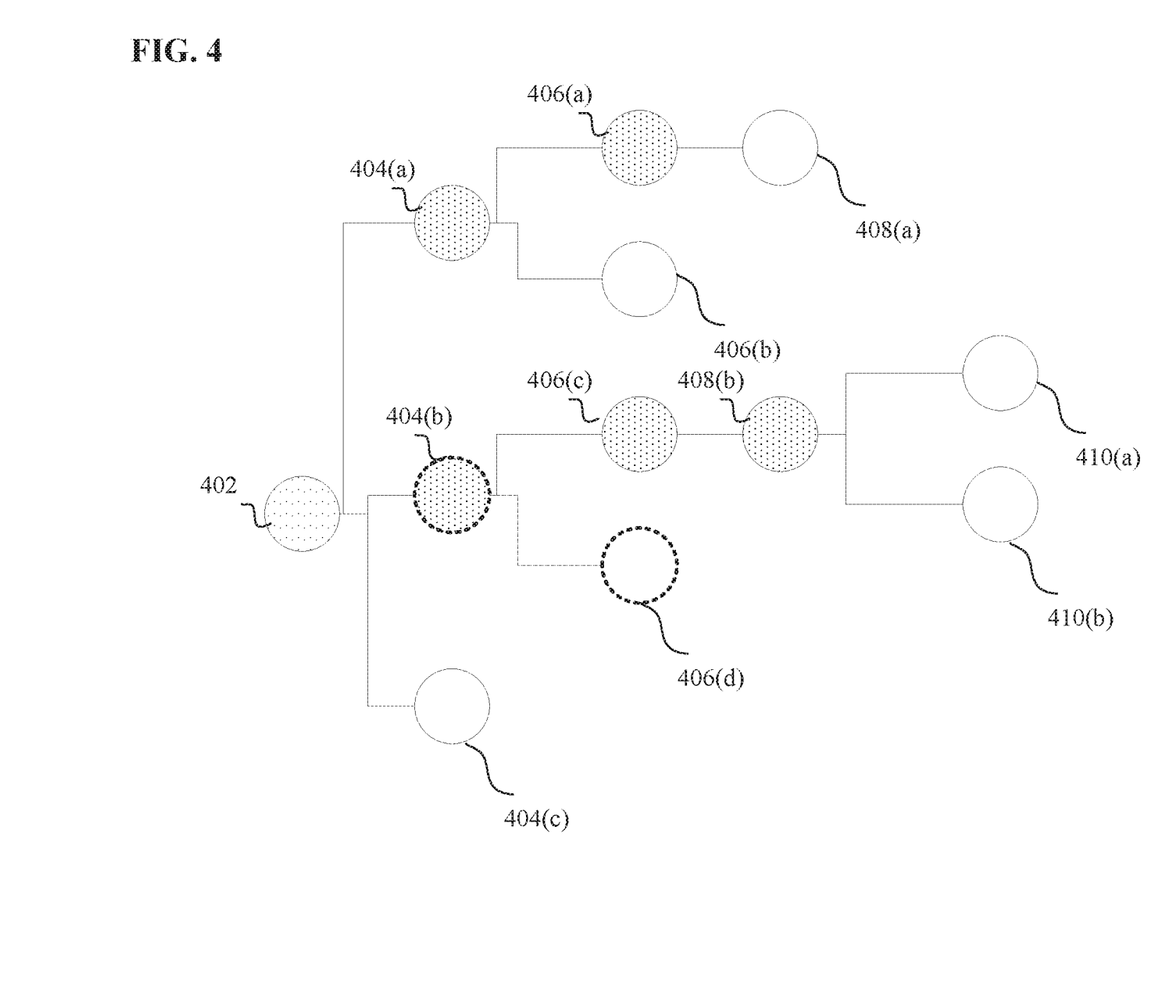
FIG. 4 is an example dependency map according to an example embodiment.

FIG. 4 is an example dependency map according to an example embodiment. As illustrated in FIG. 4, a dependency map 400 includes a first level task 402, a plurality of second level tasks 404(a)-(c) (collectively referred to as second level tasks 404), a plurality of third level tasks 406(a)-(d) (collectively referred to as third level tasks 406), a plurality of fourth level task 408(a)-(b) (collectively referred to as fourth level tasks 408), and a plurality of fifth level tasks 410 (a)-(b) (collectively referred to as fifth level tasks 410). It should be understood by those of ordinary skill the arts that FIG. 4 is merely an example dependency map illustrating five levels of tasks, and that more or less levels of tasks may be displayed on the dependency map 400. In some embodiments, the dependency map 400 may be an interactive map, such that a user may select any one of the first level task 402, second level tasks 404, third level tasks 406, fourth level tasks 408, or fifth level tasks 410 to view the application layer information and/or the network layer information of the selected task. For example, as illustrated in FIG. 4, the user may select task 402 to view the application layer information and the network layer information of this task.

In some embodiments, the dependency map 400 may be expandable and collapsible. For example, any task having one or more sub-tasks may be colored, shaded, or the like, to visually indicate to the user that the given task is associated with one or more sub-task(s). In some embodiments, the user may select the task to expand to the dependency map 400 to illustrate a subsequent level of task(s) associated with the selected task. When the dependency map is expanded to illustrate the subsequent level of task(s), the user may select the same task to collapse the subsequent level of task(s). For example, as illustrated in FIG. 4, tasks 402, 404(a), 404(b), 406(a), 406(c), and 408(b) may each be selected to expand or collapse a subsequent level of tasks. Although FIG. 4 illustrates the dependency map 400 as being a branched tree, it should be understood by those of ordinary skill in the arts that this is merely an example and that other formats for illustrating the dependency map 400 are further contemplated in accordance with aspects of the present disclosure.

In some embodiments, the dependency map 400 may also illustrate one or more tasks and any sub-tasks that are a task error. The affected tasks may be colored, shaded, or the like, to visually indicate to the user that the given task is associated with one or more sub-task(s). For example, as shown in FIG. 4, the tasks 404(b) and 406(d) may have a dashed lined to visually indicate the task error. In further embodiments, the dependency map 400 may also distinguish between a type of the plurality of tasks (e.g., an REST API, SOAP API, or any other API) using, for example, different colored branches for each type of task within the branched tree.

Figure 5:
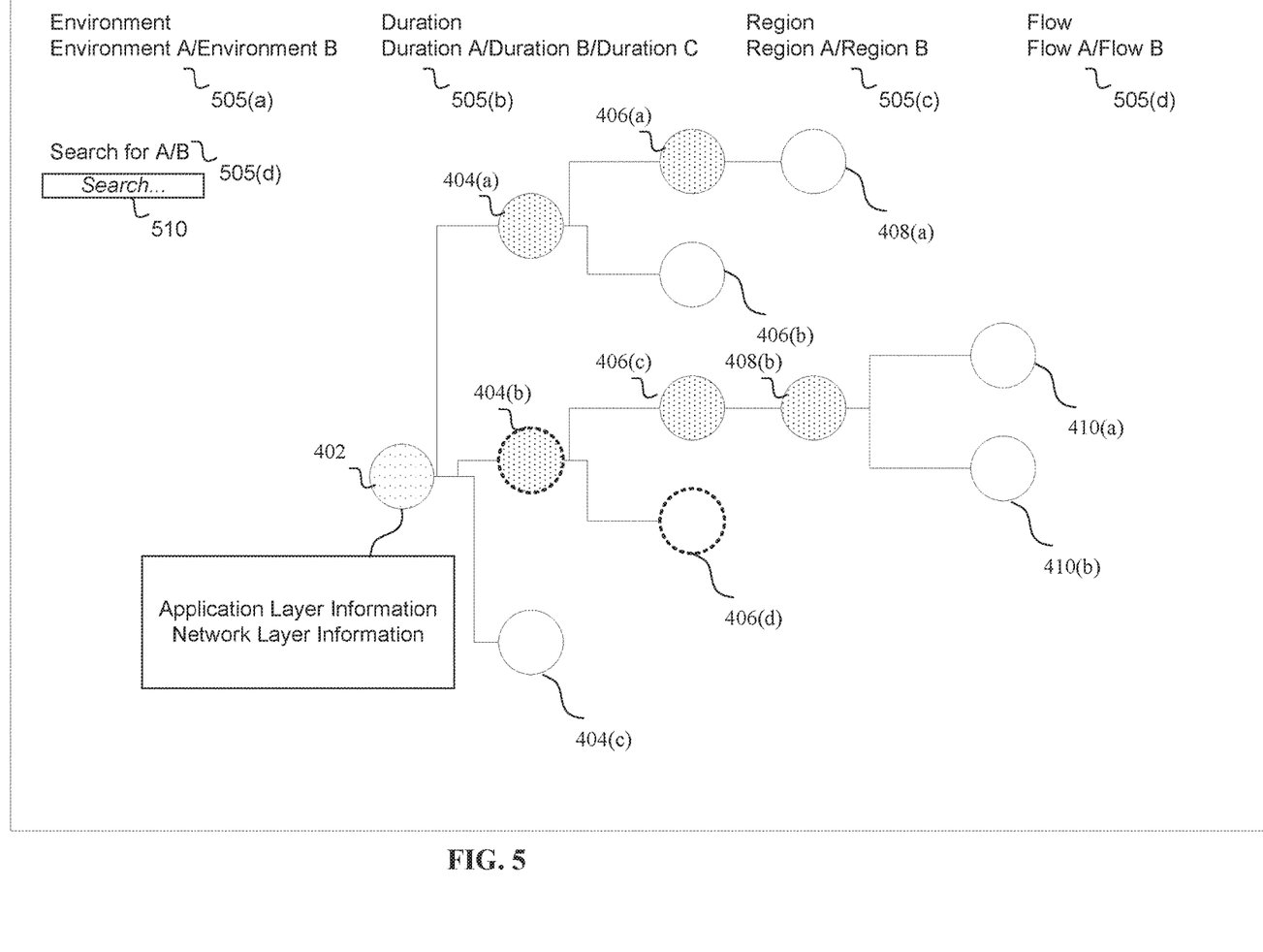
FIG. 5 is an example of an interactive graphical user interface (GUI) according to an example embodiment.

FIG. 5 is an example of an interactive graphical user interface (GUI) according to an example embodiment. As illustrated in FIG. 5, an interactive GUI 500 may include a dependency map, e.g., the dependency map 400 of FIG. 4, as well as a plurality of selectable parameters 505(a)-505(e). In response to selecting one or more of the selectable parameters, the dependency map may be updated to reflect the relationship between the identified task and the respective computing device that executed the identified task based on the given parameter. The first selectable parameter 505(a) may be an environment having two selectable environments. The environment may be, for example, a pre-production environment or a production environment for the plurality of tasks. The second selectable parameter 505(b) may be a duration having three selectable durations. The duration may be, for example, a day, a week, or a month. The third selectable parameter 505(c) may be a region having two selectable regions. The regions may be, for example, based on a geographical location where the plurality of computing devices distributed across a network architecture are located. The fourth selectable parameter 505(d) may be a flow having two selectable flows. The flows may be, for example, based on applications executed on the cloud services provider system 102 or the client system 128.

In some embodiments, the user may then select the fifth selectable parameter 505(e) that may then be searched using, for example, a search tool 510. The fifth selectable parameter 505(e) may be used to select, for example, a task or a computing device, such that the user may search for a specific level of tasks or a specific computing device using the search tool 510. In response to receiving a search query, the dependency map 400 may be updated to illustrate the searched parameter.

Example Computer System

Figure 6:
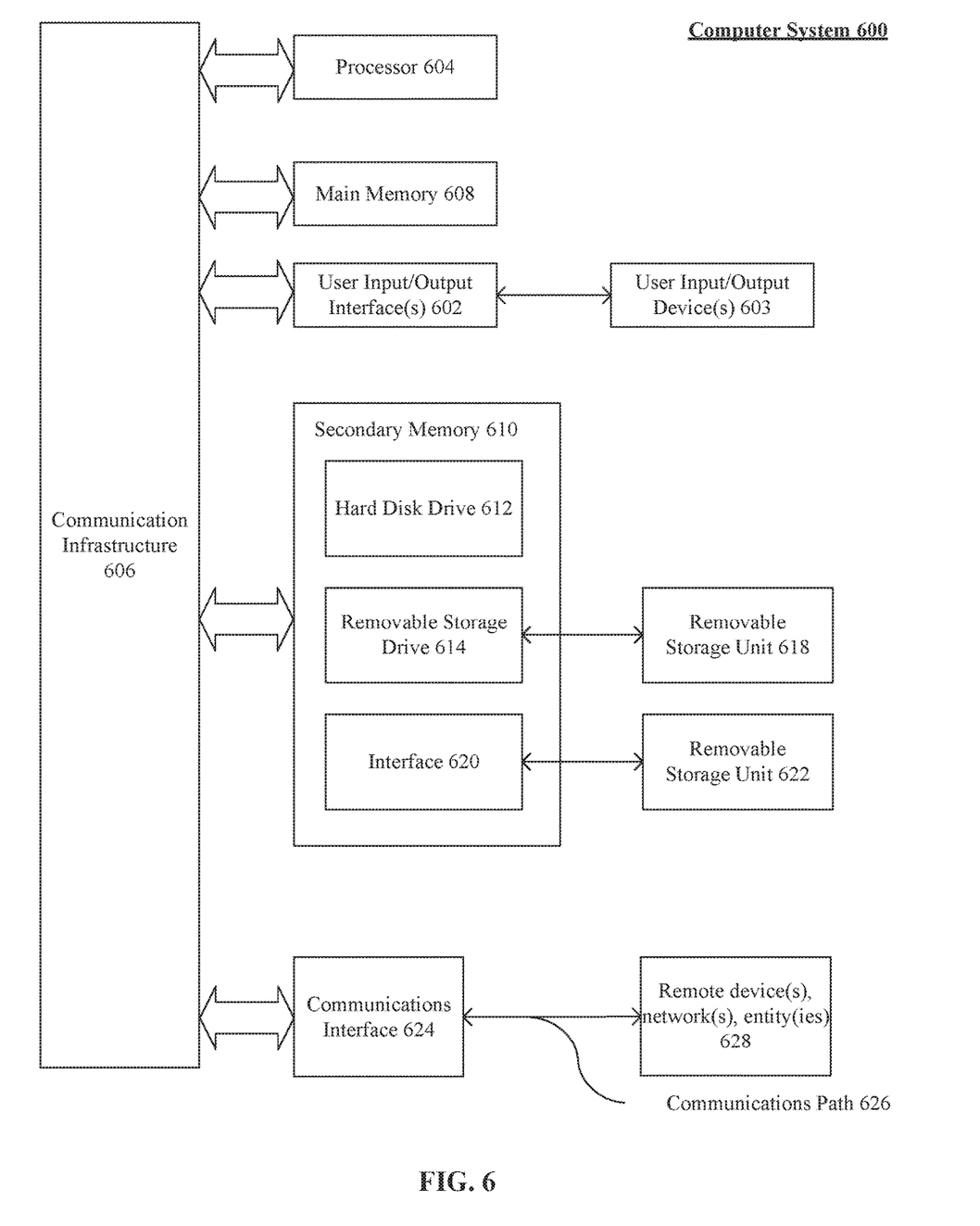
FIG. 6 is an example computer system useful for implementing various embodiments of this disclosure.

Various embodiments and components therein can be implemented, for example, using one or more well-known computer systems, such as, for example, the example embodiments, systems, and/or devices shown in the figures or otherwise discussed. Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an example embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communications path 626.

In an embodiment, a non-transitory, tangible apparatus or article of manufacture comprising a non-transitory, tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all example embodiments as contemplated by the inventor, and thus, are not intended to limit this disclosure or the appended claims in any way.

While this disclosure describes example embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A computer-implemented method comprising:
accessing an execution log storing information related to a plurality of tasks, each task of the plurality of tasks being executed by a respective computing device of a plurality of computing devices distributed across a network architecture;
identifying a task of the plurality of tasks to obtain application layer information of the identified task;
based on the information from the execution log, determining which respective computing device executed a given instantiation of the identified task to obtain network layer information of the respective computing device;
generating a dependency map illustrating a relationship between the identified task and the respective computing device that executed the given instantiation of the identified task, the relationship including the application layer information and the network layer information;
displaying, using an interactive graphical user interface (GUI) on a user device, the dependency map;
monitoring state information of the relationship between the identified task and the respective computing device that executed the given instantiation of the identified task; and
updating the dependency map based on the state information.

2. The method of claim 1, wherein determining which one of the plurality of computing devices executed the given instantiation of the identified task is based on a network address.

3. The method of claim 1, wherein updating the dependency map comprises displaying, on the dependency map, a task error based on the state information.

4. The method of claim 3, wherein displaying the task error further comprises indicating a sub-task affected by the task error.

5. The method of claim 1, wherein monitoring the state information comprises updating the state information on a periodic basis.

6. The method of claim 1, further comprising:
identifying a sub-task of the identified task to obtain application layer information of the identified sub-task; and
based on the information from the execution log, determining which one of the plurality of computing devices executed a given instantiation of the identified sub-task to obtain network layer information of the computing device that executed the given instantiation of the identified sub-task.

7. A system, comprising:
a memory for storing instructions for determining a dependency between a task and a hardware component executing the task; and
a processor, communicatively coupled to the memory, configured to execute the instructions, the instructions causing the processor to:
access an execution log storing information related to a plurality of tasks, each task of the plurality of tasks being executed by a respective computing device of a plurality of computing devices distributed across a network architecture;
identify a task of the plurality of tasks to obtain application layer information of the identified task;
based on the information from the execution log, determine which respective computing device executed a given instantiation of the identified task to obtain network layer information of the respective computing device;
generate a dependency map illustrating a relationship between the identified task and the respective computing device that executed the given instantiation of the identified task, the relationship including the application layer information and the network layer information;
display, using an interactive graphical user interface (GUI) on a user device, the dependency map;
monitor state information of the relationship between the identified task and the respective computing device that executed the given instantiation of the identified task; and
update the dependency map based on the state information.

8. The system of claim 7, wherein the processor is further configured to determine which respective computing device executed the given instantiation of the identified task based on a network address.

9. The system of claim 7, wherein, to update the dependency map, the processor is further configured to display, on the dependency map, a task error based on the state information.

10. The system of claim 9, wherein the processor is further configured to indicate a sub-task affected by the task error.

11. The system of claim 7, wherein the processor is further configured to update the state information on a periodic basis.

12. The system of claim 7, wherein the processor is further configured to:
identify a sub-task of the identified task to obtain application layer information of the identified sub-task; and
based on the information from the execution log, determine which one of the plurality of computing devices executed the given instantiation of the identified sub-task to obtain network layer information of the computing device that executed the given instantiation of the identified sub-task.

13. A non-transitory, tangible computer-readable device having instructions stored thereon that, when executed by at least one computing device, causes the at least one computing device to perform operations comprising:
accessing an execution log storing information related to a plurality of tasks, each task of the plurality of tasks being executed by a respective computing device of a plurality of computing devices distributed across a network architecture;
identifying a task of the plurality of tasks to obtain application layer information of the identified task;
based on the information from the execution log, determining which respective computing device executed a given instantiation of the identified task to obtain network layer information of the respective computing device;
generating a dependency map illustrating a relationship between the identified task and the respective computing device that executed the given instantiation of the identified task, the relationship including the application layer information and the network layer information;
displaying, using an interactive graphical user interface (GUI) on a user device, the dependency map;
monitoring state information of the relationship between the identified task and the respective computing device that executed the given instantiation of the identified task; and
updating the dependency map based on the state information.

14. The device of claim 13, wherein determining which one of the plurality of computing devices executed the given instantiation of the identified task is based on a network address.

15. The device of claim 13, wherein updating the dependency map comprises further comprising displaying, on the dependency map, a task error based on the state information.

16. The device of claim 15, wherein displaying the task error further comprises indicating a sub-task affected by the task error.

17. The device of claim 13, further comprising:
identifying a sub-task of the identified task to obtain application layer information of the identified sub-task; and
based on the information from the execution log, determining which one of the plurality of computing devices executed a given instantiation of the identified sub-task to obtain network layer information of the computing device that executed the given instantiation of the identified sub-task.

* * * * *